United States Patent
Upalekar et al.

(10) Patent No.: US 12,506,642 B2
(45) Date of Patent: Dec. 23, 2025

(54) CHANNEL ESTIMATION, THROUGHPUT AND FAIRNESS FOR MULTI-USER, MULTIPLEINPUT, MULTIPLE-OUTPUT (MU-MIMO) SYSTEMS THROUGH DYNAMIC PORT ALLOCATION

(71) Applicant: TEJAS NETWORKS LIMITED, Bengaluru (IN)

(72) Inventors: Divya Upalekar, Bangalore (IN); Shrinivas Bhat, Bangalore (IN); Abhay Mohan M V, Chennai (IN); Preethi R, Chennai (IN); Giridhar K, Chennai (IN)

(73) Assignee: TEJAS NETWORKS LIMITED, Bengaluru (IN)

( * ) Notice: Subject to any disclaimer, the term of this patent is extended or adjusted under 35 U.S.C. 154(b) by 363 days.

(21) Appl. No.: 18/131,303

(22) Filed: Apr. 5, 2023

(65) Prior Publication Data
US 2023/0327916 A1    Oct. 12, 2023

(30) Foreign Application Priority Data
Apr. 6, 2022   (IN) .............................. 202241020727

(51) Int. Cl.
*H04L 25/02* (2006.01)
*H04B 7/0452* (2017.01)
(Continued)

(52) U.S. Cl.
CPC ....... *H04L 25/0224* (2013.01); *H04B 7/0452* (2013.01); *H04J 13/18* (2013.01);
(Continued)

(58) Field of Classification Search
CPC ... H04L 25/022; H04L 1/0061; H04L 5/0051; H04L 1/0003; H04L 1/0057;
(Continued)

(56) References Cited

U.S. PATENT DOCUMENTS

2018/0198580 A1\* 7/2018 Nammi ............... H04L 27/0012
2019/0158206 A1  5/2019 Li
(Continued)

FOREIGN PATENT DOCUMENTS

WO   WO-2022031544 A1 \* 2/2022

OTHER PUBLICATIONS

Office Action issued in U.S. Appl. No. 18/131,324, filed Jul. 30, 2025 (22 pages).

*Primary Examiner* — Habte Mered
(74) *Attorney, Agent, or Firm* — HSML P.C.

(57) ABSTRACT

A method and system for improving channel estimation for multi-user, multiple-input, multiple-output (MU-MIMO) systems through dynamic DM-RS port allocation in a 5G New Radio network is provided. The method comprises of allocating, by a Scheduler aware UE port allocation unit, one or more MU-MIMO ports to a plurality of code division multiplexing (CDM) groups for a plurality of UE users, performing, by a code selection unit, a code selection based on a number of allocated MU-MIMO ports, determining, by a spreading factor unit, a spreading factor allocated for each of the MU-MIMO ports in each of the plurality of CDM groups, determining, by a signalling unit, a Downlink Control Information (DCI) signalling of a Partial Port Occupancy (P-Poi) transmission for each UE and obtaining, by a channel estimation unit, channel estimates at the receiver through VSFOCC de-spreading based on the P-POI assigned for each of the MU-MIMO ports.

10 Claims, 9 Drawing Sheets

(51) Int. Cl.
  *H04J 13/18*    (2011.01)
  *H04L 1/00*     (2006.01)
  *H04L 5/00*     (2006.01)
  *H04W 72/12*    (2023.01)
  *H04W 72/232*   (2023.01)

(52) U.S. Cl.
  CPC .......... *H04L 1/0061* (2013.01); *H04L 5/0051* (2013.01); *H04W 72/12* (2013.01); *H04W 72/232* (2023.01); *H04L 1/0003* (2013.01)

(58) Field of Classification Search
  CPC ... H04L 1/0067; H04L 1/0041; H04L 1/0045; H04L 5/0016; H04L 25/0232; H04L 25/025; H04B 7/0452; H04J 13/18; H04W 72/12; H04W 72/232; H04W 72/1273
  See application file for complete search history.

(56) References Cited

U.S. PATENT DOCUMENTS

| | | | |
|---|---|---|---|
| 2020/0162208 A1 | 5/2020 | Moon | |
| 2020/0336355 A1 | 10/2020 | Yamada | |
| 2024/0396658 A1* | 11/2024 | Bhamri | ............... H04J 13/12 |
| 2025/0047442 A1* | 2/2025 | Ahmadzadeh | ........ H04W 76/20 |

\* cited by examiner

CHANNEL ESTIMATION, THROUGHPUT AND FAIRNESS FOR MULTI-USER, MULTIPLEINPUT, MULTIPLE-OUTPUT (MU-MIMO) SYSTEMS THROUGH DYNAMIC PORT ALLOCATION

CROSS-REFERENCE TO RELATED APPLICATIONS

This application claims priority to Indian provisional patent application no. 202241020727 filed on Apr. 6, 2022, the complete disclosure of which, in their entirety, is herein incorporated by reference.

BACKGROUND

Technical Field

The embodiments herein generally relate to wireless communication systems and methods, and more particularly, to a system and method for improving channel estimation for MU-MIMO wireless antenna systems through dynamic port allocation.

Description of the Related Art

In modern wireless communication systems, the downlink/uplink receptions are facilitated by channel estimation and symbol detection based on reference signals typically called DMRS (Demodulation Reference Signals) in 5GNR systems. To facilitate multi-user MIMO, the reference signals assigned for layers of each user for channel estimation, are expected to be orthogonal by design. The orthogonality of these references is achieved by allocating each layer of the users, the reference signals that are orthogonal in time, frequency, or codes (CDM) domain. This kind of allocation of reference signals (a specific allocation typically referred to as a DM-RS port) involves performance trade-offs, especially in MU-MIMO scenarios.

Channel estimation reference signals for different users or different layers of the same user often occupy the same time-frequency resources in an OFDM-based downlink system. Such reference signals, or pilots, are said to adopt a pilot-on-pilot arrangement since pilots fall on top of each other. Without appropriate signal processing in the receiver, this will lead to interference between the pilots that share a particular set of time-frequency resources.

The estimation schemes in conventional MU-MIMO systems, a Demodulation reference signal (often called DM-RS in 5G) used for Channel estimation typically use the Orthogonal Cover Codes (OCC) based on Walsh Spreading to separate either the users or the multiple layers of a user. The Walsh code generation can be visualized in the form of the nested code tree structure. These reference signals apply CDM spreading across time-frequency to enable multiple users or layers to share the same time-frequency resources. The term DM-RS port is used to refer to a pilot sequence spread with a particular OCC and placed in a specific set of subcarrier indices, the maximum of which defines the maximum number of users or layers that can be loaded in MU-MIMO. During the Channel estimation process, the channel estimate is assumed to be constant across the time-frequency grid spanned by the CDM group. The spreading remains the same even when the number of users or layers in the MU-MIMO is lower than the total number of DM-RS ports that are available.

Accordingly, there is a need to mitigate and/or overcome drawbacks associated with current systems and methods for enabling DM-RS port allocation to facilitate channel estimation to improve throughput and fairness in MU-MIMO systems.

SUMMARY

Embodiments herein provide a system for providing a signal port allocation scheme that will increase the channel estimation performance and consequently the system throughput.

In one aspect, the embodiments herein disclose a method for improving channel estimation for multi-user, multiple-input, multiple-output (MU-MIMO) systems through dynamic DM-RS port allocation in a 5G New Radio network. The method comprises of allocating, by a Scheduler aware UE port allocation unit, one or more MU-MIMO ports to a plurality of code division multiplexing (CDM) groups for a plurality of UE users, performing, by a code selection unit, a code selection based on a number of MU-MIMO ports allocated to the plurality of CDM groups, determining, by a spreading factor unit, a spreading factor allocated for each of the MU-MIMO ports in each of the plurality of CDM groups, determining, by a signalling unit, a Downlink Control Information (DCI) signalling of a Partial Port Occupancy (P-Poi) transmission for each UE and obtaining, by a channel estimation unit, channel estimates at the receiver through VSFOCC de-spreading based on the P-POI assigned for each of the MU-MIMO ports. The Code Division Multiplexing (CDM) group herein is a set of time-frequency resources where MU-MIMO ports are multiplexed using the orthogonality of code.

According to the embodiments herein, the method further comprises interpolating, by a linear or DFT interpolator, the obtained channel estimates to determine the channel over a number of Physical Resource blocks ($N_{PRB}$). Interpolation along with VSFOCC dispreading increases the performance gain for channels.

According to the embodiments herein, the Scheduling aware UE port mapping unit allots a plurality of spreading factors for the plurality of UE users based on a Modulation and Coding Scheme (MCS) information from a schedule unit.

According to the embodiments herein, the code selection for each MU-MIMO port scheduled in the CDM group is assigned from an Orthogonal Variable Spreading Factor (OVSF tree) structure, where each MU-MIMO port present in a same CDM group is mapped to unique Orthogonal Cover Codes (OCC).

According to the embodiments herein, the method further comprises of combining, by the channel estimator unit, least square estimation and P-Poi information-based de-spreading of the plurality of CDM groups to perform channel estimation.

According to the embodiments herein, the method further comprises of reducing an interpolation error of the channel estimates by increasing the number of unique channel estimates for partially loaded CDM groups through VSFOCC despreading.

In another aspect, the embodiments herein disclose a system for improving channel estimation for multi-user, multiple-input, multiple-output (MU-MIMO) systems in 5G New Radio Network. The system comprises a transmitter and a receiver. The transmitter comprises a Scheduler aware UE port allocation unit to allocate one or more MU-MIMO ports to a plurality of code division multiplexing (CDM)

groups for a plurality of UE users, a code selection unit to perform code selection according to a number of MU-MIMO ports assigned in the plurality of CDM groups, where a Code Division Multiplexing (CDM) group is a set of time-frequency resources where MU-MIMO ports are multiplexed using orthogonality of codes, a scheduler aware UE port mapping unit to allot a reduced despreading factor for the users based on the Modulation and Coding Scheme (MCS) and a total number of scheduled user information received from the Scheduler aware UE port allocation unit, a Spreading factor unit to determine the spreading factor for the allocated one or more MU-MIMO ports in each of the plurality of CDM groups and a signalling unit to transmit Downlink Control Information (DCI) Signalling of a Partial Port Occupancy (P-Poi) information for each User Equipment. The receiver comprises a channel estimator unit to perform channel estimation with VSFOCC de-spreading based on a Partial Port Occupancy (P-Poi) assigned for each of the MU-MIMO ports and a linear or DFT interpolator to interpolate the obtained channel estimates over a number of Physical Resource blocks, $N_{PRB}$, wherein the interpolation along with VSFOCC despreading increases performance gain for channels.

According to an embodiment herein, the channel estimator unit further combines a least square estimation and P-Poi information-based de-spreading of the plurality of CDM groups to perform channel estimation. The interpolator is configured to reduce an interpolation error of the channel estimates by increasing a number of distinct channel estimates for partially loaded CDM groups through VSFOCC despreading.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

Figure 1:
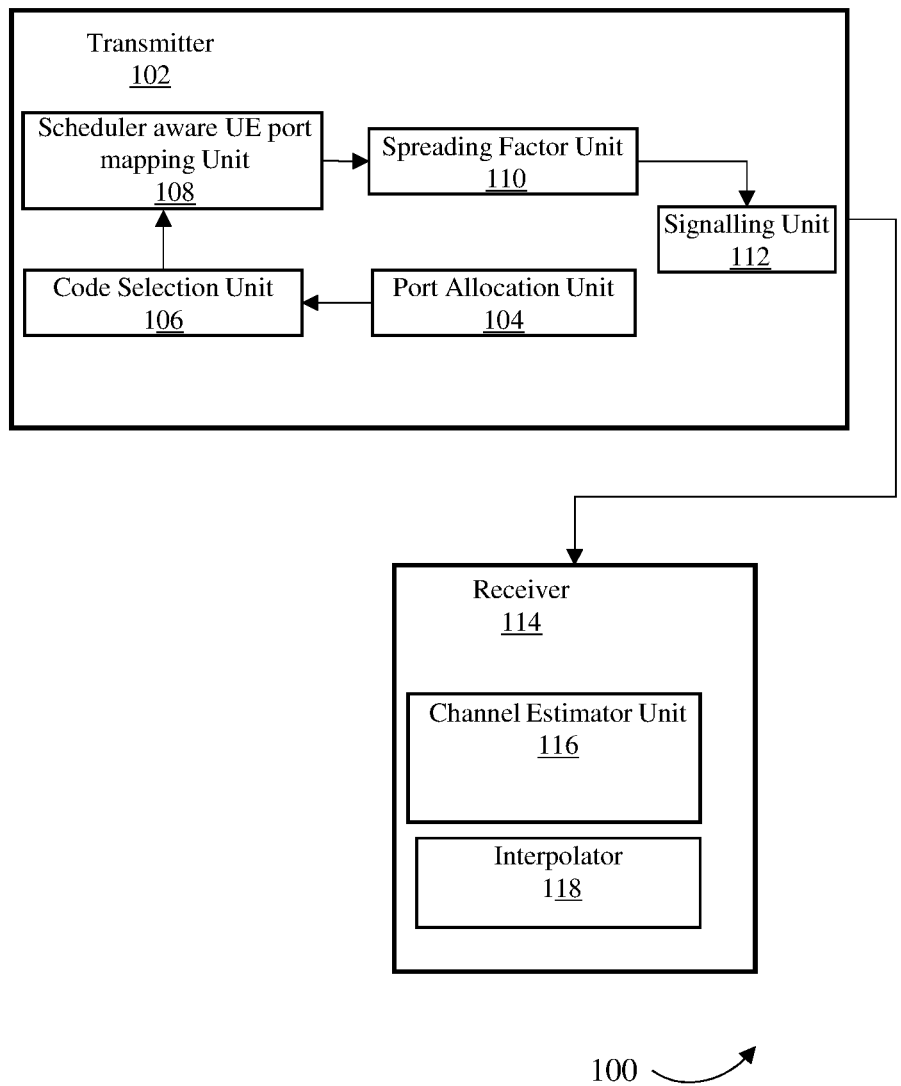
FIG. 1 is a block diagram illustrating a system for improving channel estimation for multi-user, multiple-input, multiple-output (MU-MIMO) systems through dynamic port allocation, according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended the merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and a method to enable improved Channel estimation quality for partially loaded DM-RS ports without compromising the estimation performance on the other ports. Referring now to the drawings, and more particularly to FIGS. 1 through 6D, where similar reference characters denote corresponding features consistently throughout the figures, there are shown preferred embodiments.

FIG. 1 is a block diagram of a Multi-user, multiple-input, multiple-output (MU-MIMO) system enabling DM-RS port allocation to improve channel estimation, according to the embodiments of the present disclosure. The MU-MIMO system 100 includes a transmitter 102 and a receiver 114. The transmitter 102 comprises a Scheduler aware UE port allocation unit 104, a code selection unit 106, a scheduler-aware UE port mapping unit 108, a Spreading factor unit 110, and a signalling unit 112. The receiver 114 comprises a channel estimator unit 116 and an interpolator 118.

The Scheduler aware UE port allocation unit 104 allocates a specific number of MU-MIMO ports to a plurality of code division multiplexing (CDM) groups for a plurality of UE users. The port allocation can be made in multiple ways. The order in which the CDM group is filled varies for each case with the same number of ports getting advantage of MSE. E.g., If 10 ports are scheduled in total, the port allocation across three CDM groups in a double symbol Type 2 DM-RS can be (4,4,2) or (4,3,3), as both add up to 10. The order in the above 3-tuples does not matter. For example, (4,4,2) as described above can be treated as equivalent to (2,4,4) and (4,2,4). The key factor is the number of ports assigned in each group. The specific CDM group to which the ports are assigned doesn't matter, and all such mappings are equally valid. The objective of port allocation is to maximize the number of partially loaded CDM groups. To achieve this, ports can be mapped sequentially to CDM groups in an orderly fashion.

The code selection unit 106 is configured to perform code selection according to the number of ports assigned in the CDM group. A Code Division Multiplexing (CDM) group is a set of time-frequency resources where MU-MIMO ports are multiplexed using the orthogonality of codes. These codes are termed Orthogonal Cover Codes (OCC) in the context of 5G NR. The orthogonal codes are derived as shown below. The length of the code is controlled by the Spreading Factor (SF). The 'child' codes with a higher spreading factor are derived from a 'parent' code with a lower spreading factor, forming a tree structure. This tree connects orthogonal codes with various spreading factors.

Hence, it is termed as Orthogonal Variable Spreading Factor (OVSF) code tree as shown below.

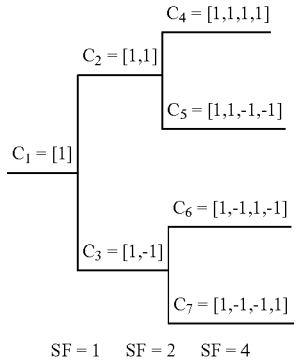

SF = 1    SF = 2    SF = 4

In the code tree, the parent code (the one with a lower spreading factor) will be orthogonal to the child codes of the other parent code. The parent and child codes are of different lengths, so the orthogonality should be understood as follows. Here, each code $C_i$ can be represented as $[C_{i1}, C_{i2}, \ldots, C_{iSF}]$. The parent code $C_2$ is orthogonal to the child code segments $[C_{61}, C_{62}]$ and $[C_{63}, C_{64}]$ and the child code segments $[C_{71}, C_{72}]$ and $[C_{73}, C_{74}]$. Thus, if two ports are present in a CDM group (Here one CDM can support only 2 ports for a Single Symbol Type 1 DM-RS. As there are two CDM groups in a single symbol Type 1 DM-Rs, it supports a maximum of 4 ports), each code is taken from a different parent code. If three ports are present, two child codes of the same parent are chosen, and the third port is given the parent code of the other branch. Since the ports are already mapped to one unique code, code selection is equivalent to port selection.

In some embodiments, the OCC codes are spread across two subcarriers in one OFDM symbol. Thus, single symbol DM-RS can support two ports per CDM group denoted as $P_1$, $P_2$ using length-2 codes. Double symbol DM-RS can schedule four ports per CDM group, denoted as $P_1$, $P_2$, $P_3$, and $P_4$ using length-4 codes. Though the Type 1 and Type 2 patterns differ in the position of pilots, the CDM group size and the ports supported in a CDM group remain the same.

The port allocation strategy across CDM groups according to the embodiments of the present disclosure is shown in the following tables. Single symbol Type 1 DM-RS can support up to four ports. But if only three ports are required, two ports can be accommodated in CDM group 0 and the remaining port is placed in CDM group 1 as mentioned in Table 1.1 below. Since there is only one port in CDM group 1, there is no need for code orthogonality. Hence, in the receiver, the despreading factor can be viewed as one instead of two. This means that FD-CDM despreading is not required and there will be two distinct estimates per CDM group instead of one. Thus, the port in CDM group 1 will get twice the number of distinct channel estimates unlike the ports in CDM group 0. Note that the number of UEs allotted in all CDM groups is represented as (number of UEs in CDM 0, No. of UEs in CDM 1, No. of UEs in CDM 2). If there are 10 ports in the double symbol Type 2 configuration (table 1.4), the ports can be placed across CDM groups as (4,4,2) or (3,3,4). In both cases, two ports will get the advantage of getting more distinct channel estimates. From the above discussion, we can say that ports in partially filled CDM groups can use sequences with lower spreading factors from the code tree that can be exploited to get the MSE advantage. Thus, based on this constraint the possible port allocation for DM-RS configuration is as mentioned in Tables 1.1-1.4 below.

TABLE 1.1

SINGLE SYMBOL TYPE 1

| No of ports | Ports Allocation | | Ports gaining MSE advantage |
|---|---|---|---|
| | CDM 0 | CDM 1 | |
| 1 | 1 | | 1 |
| 2 | 1 | 1 | 2 |
| 3 | 2 | 1 | 1 |
| 4 | 2 | 2 | 0 |

TABLE 1.2

SINGLE SYMBOL TYPE 2

| No of ports | Ports Allocation | | | Ports gaining MSE advantage |
|---|---|---|---|---|
| | CDM 0 | CDM 1 | CDM 2 | |
| 1 | 1 | | | 1 |
| 2 | 1 | 1 | | 2 |
| 3 | 1 | 1 | 1 | 3 |
| 4 | 2 | 1 | 1 | 2 |
| 5 | 2 | 2 | 1 | 1 |
| 6 | 2 | 2 | 2 | 0 |

TABLE 1.3

DOUBLE SYMBOL TYPE 1

| No of ports | Ports Allocation | | Ports Gaining MSE Advantage |
|---|---|---|---|
| | CDM 0 | CDM 1 | |
| 1 | 1 | | 1 |
| 2 | 1 | 1 | 2 |
| 3 | 2 | 1 | 3 |
| 4 | 2 | 2 | 4 |
| 5 | 3 | 2 | 3 |
| 6 | 3 | 3 | 2 |
| 7 | 4 | 3 | 1 |
| 8 | 4 | 4 | 0 |

TABLE 1.4

DOUBLE SYMBOL TYPE 2

| No of ports | Ports Allocation | | | Ports gaining MSE advantage |
|---|---|---|---|---|
| | CDM 0 | CDM 1 | CDM 2 | |
| 1 | 1 | | | 1 |
| 2 | 1 | 1 | | 2 |
| 3 | 1 | 1 | 1 | 3 |
| 4 | 2 | 1 | 1 | 4 |
| 5 | 2 | 2 | 1 | 5 |
| 6 | 2 | 2 | 2 | 6 |
| 7 | 3 | 2 | 2 | 5 |
| 8 | 3 | 3 | 2 | 4 |
| | 4 | 2 | 2 | |
| 9 | 3 | 3 | 3 | 3 |
| 10 | 4 | 3 | 3 | 2 |
| | 4 | 4 | 2 | 2 |

TABLE 1.4-continued

DOUBLE SYMBOL TYPE 2

| No of ports | Ports Allocation | | | Ports gaining MSE advantage |
|---|---|---|---|---|
| | CDM 0 | CDM 1 | CDM 2 | |
| 11 | 4 | 4 | 3 | 1 |
| 12 | 4 | 4 | 4 | 0 |

Here, the ordering of ports across CDM groups need not be the same as that shown in the table. Other orderings of ports are also possible.

Further, the pattern for filling the DM-RS CDM groups in the transmit side ensures maximum partially loaded groups. The Scheduler aware UE port mapping Unit 108 allots the reduced despreading factor for the users based on the Modulation and Coding Scheme (MCS) and a total number of scheduled user information received from the Scheduler aware UE port allocation unit 104. For example, In Type 1 Single Symbol DM-RS Configuration, four ports are possible. Suppose that 3 users are present and can only be scheduled with one layer each. Thus, three out of the possible four ports are occupied. Further, suppose that $U_1$, $U_2$, $U_3$ have modulations 4QAM, 16QAM and 64QAM. Then, there are two possibilities.

(i) To be fair, we can give $U_1$ the MSE advantage, and hence promote it from 4QAM to 16QAM.
  (ii) Based on the sum-rate metric, we can give $U_3$ the MSE advantage. This ensures BLER is lower for 64QAM since channel estimation errors lead to more errors in 4QAM than 64QAM.
  (iii) In this example, instead of improving the modulation, moving to a higher code rate can also achieve an improvement in the data transmission rate.

In some embodiments, the codes are selected for the ports scheduled in the CDM group from the OVSF tree. While the mapping of ports to the CDM group is important, assigning the appropriate codes from the OVSF tree is equally critical. The spreading factor unit 110 determines the spreading factor for the allocated one or more MU-MIMO ports in each of the plurality of CDM groups. The spreading factor allocation within a CDM group for all cases is mentioned in Table 2 below. Valid combinations of parent and child codes that ensure orthogonality should be selected. Otherwise, the orthogonality between sequences with lower SF and higher SF cannot be exploited. Each port in the DM-RS is multiplexed among time, frequency, and code. The ports present in the same CDM group are mapped to unique OCC codes, which vary according to the DM-RS configuration. The code to port mapping in the single symbol is done for $(P_1, P_2)$ as $(C_2, C_3)$ and the port mapping for $(P_1, P_2, P_3, P_4)$ in the double symbol as $(C_4, C_5, C_6, C_7)$. As discussed earlier, after selecting the number of ports in a CDM group, the code selection must be made. Hence each port is mapped to a unique OCC code. Choosing the port will indirectly assign the corresponding code. The port assignment is made following the concept of OVSF. The possible code mappings in a CDM group for all possible scenarios are shown in Table 2. In a scenario when three ports are present in a CDM group, there are three ways of allocating ports (Refer row 3 in Table 2). In which two codes are derived from the same parent and the third code belongs to a different parent. In a two-port case, each code must be taken from different parents. For that, four possible port-code assignment is available as shown in Table 2.

TABLE 2

VSFOCC Spreading Factor Allocation for a CDM Group

| No. of Ports | Single Symbol DM-RS | | Double Symbol DM-RS | |
|---|---|---|---|---|
| | DCI Port Allocation | SF at Receiver | DCI Port Allocation | SF at Receiver |
| 1 | $P_1$ or $P_2$ | 1 | $P_1$ or $P_2$ or $P_3$ or $P_4$ | 2 |
| 2 | $(P_1, P_2)$ | (2, 2) | $(P_1, P_2)$ or $(P_1, P_4)$ or $(P_2, P_3)$ or $(P_2, P_4)$ | (2, 2) |
| 3 | — | — | $(P_1, P_2, P_3)$ or $(P_1, P_3, P_4)$ or $(P_1, P_3, P_4)$ | (4, 4, 2) |
| 4 | — | — | $(P_1, P_2, P_3, P_4)$ | (4, 4, 4, 4) |

In some embodiments, the signalling module 112 transmits DCI Signalling of the Partial Port Occupancy (P-Poi) information for each User Equipment.

The receiver 114 herein comprises a channel estimator unit 116. The channel estimator unit 116 combines both Least Square (LS) estimation and P-Poi information-based despreading of the CDM groups. In partially filled CDM groups, the spreading factor for despreading will be lower. In the 5G-NR context this directly corresponds to skipping the FD-CDM despreading step in channel estimation for those ports. Generally, the despreading step can descend to a lower spreading factor in the OVSF tree. This leads to an increase (double channel estimates in 5G-NR context) in the number of distinct channel estimates on those ports.

In some embodiments, the channel estimator unit 116 performs channel estimation with VSFOCC despreading as follows. The received signal undergoes Cyclic Prefix (CP) removal and after taking FFT, the frequency domain data at the lth OFDM symbol can be written as, $$y = \sum_{p=1}^{P} X^{(p)} H^{(p)} + Z$$

where, Y is of size N×1. Also, $X^{(p)}$ is the diagonal matrix of size N×N having $a_{k,i}^p$ as non-zero entries in the corresponding DM-RS positions or data from port p. Finally, $H^{(p)}$ is the N×1 channel vector between $p^{th}$ port and the receiver at $l^{th}$ symbol, and Z is N×1 zero-mean complex Gaussian noise, where $Z \sim N(0, \sigma_n^2 I_N)$, where $\sigma_n^2$ is the variance of noise.

The despreading and Least Squares (LS) channel estimate at q'th subcarrier index for the port p is given by, $$\hat{H}^p(q') = \frac{1}{SF}\left(\sum_{i \in I}\sum_{j \in k'} Y'_{k,i} w_f(j) w_t(i) r*(2n+j)\right)$$

Further, the estimated locations are formulated as, $$q' = \begin{cases} 4n + \Delta, & \text{Configuration Type 1} \\ 6n + \Delta, & \text{Configuration Type 2} \end{cases}$$

For the VSFOCC allocation according to the embodiments herein, the modified estimate allocation in the frequency axis is given by, $$q' = \begin{cases} 4n + 2k' + \Delta, & \text{Configuration Type 1} \\ 6n + k' + \Delta, & \text{Configuration Type 2} \end{cases}$$

The total number of estimates in the allotted PRBs, $N_e$ depends on the spreading factor as, $$N_e = \begin{cases} \dfrac{6N_{PRB}}{SF}, & \text{Configuration Type 1} \\ \dfrac{4N_{PRB}}{SF}, & \text{Configuration Type 2} \end{cases}$$

where $\hat{H}_p$ is the $N_e \times 1$ estimate vector. $Y_{j,i}'$ is the $(j,i)^{th}$ element from the received grid of a slot after removing guard subcarriers from Y. SF values are assigned as mentioned in Table 2.

The channel estimates obtained from above are interpolated using an interpolator 118, where the interpolator may be a liner or DFT interpolator, to estimate the channel over $N_{PRB}$ subcarriers. The DFT-based channel interpolation exploits the property of having more CFR estimates than the CP length. Thus, the channel taps are resolved without losing much information. However, for banded allocation where the number of pilots could be less than the CP length, the multipath components cannot then be adequately resolved in the time domain. Denoising this CIR with poor resolution induces a loss in performance. The linear or DFT interpolator 118 is configured to reduce an interpolation error of the channel estimates by increasing a number of distinct channel estimates for partially loaded CDM groups through VSFOCC despreading.

Figure 2:
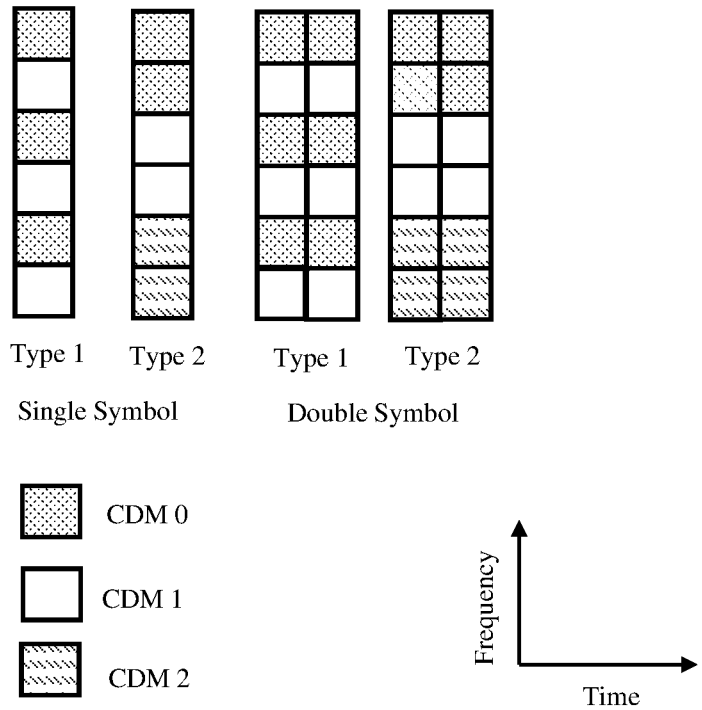
FIG. 2 is a schematic representation of a demodulation reference signal (DM-RS) configuration, according to the embodiments herein.

FIG. 2 is a schematic representation of a demodulation reference signal (DM-RS) configuration, according to the embodiments herein. The DM-RS in 5G NR uses Orthogonal Cover Codes (OCC) to introduce the orthogonality across the MU-MIMO ports. These DM-RS for Physical Downlink Shared Channel or Physical Uplink Shared Channel (PDSCH or PUSCH) has the flexibility to support a wide range of configurations. In single symbol DM-RS, Code Division Multiplexing (CDM) is only over the frequency domain (FD-CDM) occupying two Resource Elements (REs). In double symbol DM-RS, CDM utilizes four REs over both the time and frequency domains (FD+TD CDM). Based on the position of DM-RS pilots in frequency, they can be further classified into two types. While Type 1 DM-RS occupies alternate subcarriers, Type 2 has two pairs of two consecutive subcarriers in a Physical Resource Block (PRB), where both pairs are four subcarriers apart. Hence, Type 1 has two CDM groups, and Type 2 has three CDM groups as shown in FIG. 2.

Figure 3:
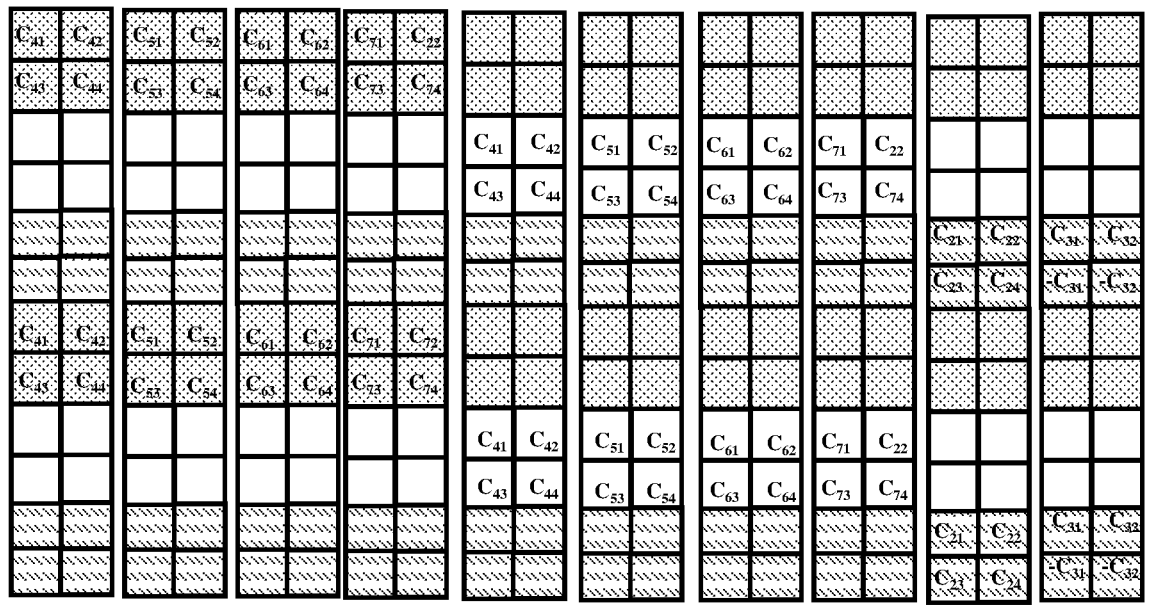
FIG. 3 is an example illustration of a DMRS VSFOCC allocation for Type-2 Configuration, according to the embodiments herein.

FIG. 3 is an example illustration of a DMRS VSFOCC allocation for Type-2 Configuration, according to the embodiments herein. The lower spreading factor based despreading doubles the number of distinct channel estimates at the receiver. In Multi-User MIMO (MU-MIMO) antenna systems, multiple users are served in the same set of physical resource blocks. The example embodiment according to FIG. 3 considers a MU-MIMO scenario employing Type 2 configuration with P=10 users 902a-902j, where each user (902a-902j) is allotted with a single layer. One possible allocation to get the maximum number of estimates in {CDM 0, CDM 1, CDM 2} is {($P_1$, $P_2$, $P_3$, $P_4$), ($P_1$, $P_2$, $P_3$, $P_4$), ($P_1$, $P_4$)} with Spreading Factor (SF) assigned as {(4, 4, 4, 4), (4, 4, 4, 4), (2, 2)}. The receiver views this allocation as shown in FIG. 9. From the allocation, it can be observed that CDM group 2 is partially filled. So, length-2 OCC codes are sufficient to bring the orthogonality between the ports. Hence, the despreading needs to be done only in the time domain. As a result, ports $P_1$ and $P_4$ in CDM group 2 will get twice the distinct estimates as compared to other ports. However, in order to achieve this, those two ports must be chosen such that the ports are mapped to the codes derived from different parents.

Figure 4:
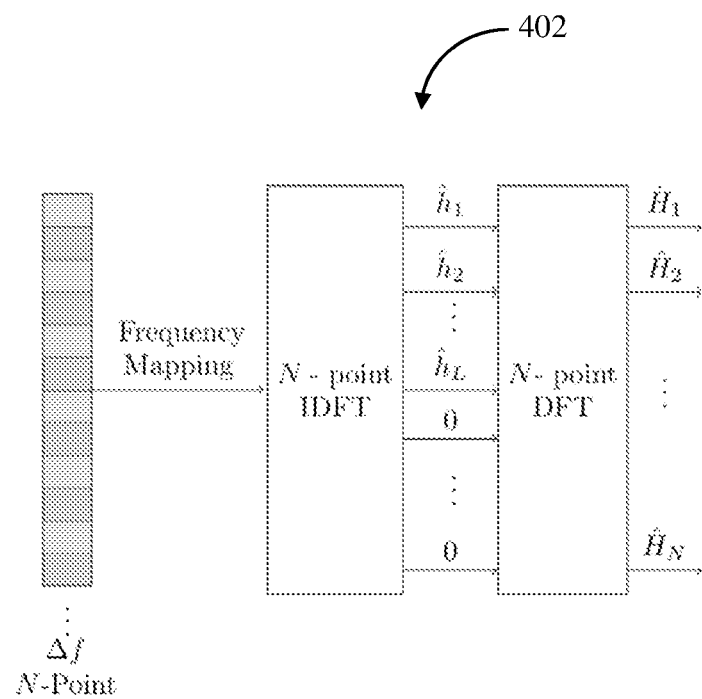
FIG. 4 is a block diagram illustrating a Discrete Fourier Transform (DFT) Interpolation process, according to the embodiments herein.

FIG. 4 is a block diagram illustrating a Discrete Fourier Transform (DFT) Interpolation process, according to the embodiments herein. The CFR estimates obtained from Channel Estimation with VSFOCC Despreading are interpolated to estimate the channel over $N_{PRB}$ subcarriers. The DFT-based channel interpolation has the advantage of more CFR estimates than the predefined cyclic prefix (CP) length. Thus, the channel taps are resolved without losing much information. Hence, time-domain denoising can be done without changing the sampling frequency. However, for banded allocation where the number of pilots could be less than the CP length, the multipath components cannot then be adequately de-noised in the time domain, inducing loss in performance.

According to the embodiments herein, the DFT interpolator 402 is selected according to the following two scenarios:

i) Ne≥Ncp: In this case, Ne-point IDFT and DFT can be employed to get the interpolated CFR.

ii) Ne<Ncp: In this case, the channel information will be lost, if N-point IDFT is not used. As there will not be enough samples in the time domain, this leads to poor resolution of the channel. Thus, the N-DFT is most suitable for DFT-based channel estimators.

Figure 5:
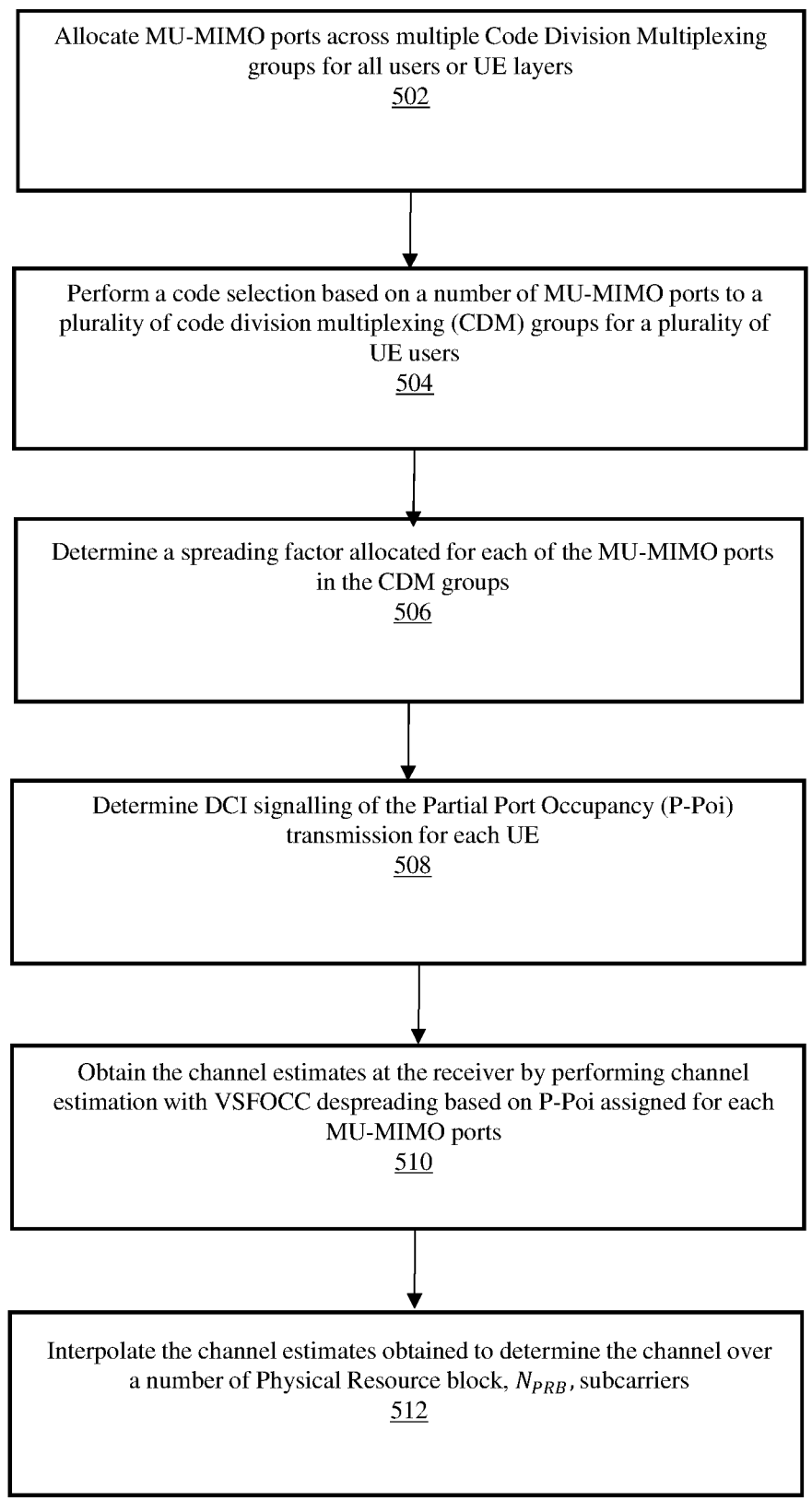
FIG. 5 is a flow chart illustrating a method for improving channel estimation for multi-user, multiple-input, multiple-output (MU-MIMO) systems through dynamic port allocation, according to the embodiments herein.

FIG. 5 is a flow chart illustrating a method for improving channel estimation for multi-user, multiple-input, multiple-output (MU-MIMO) systems through dynamic port allocation, according to the embodiments herein. At step 502, MU-MIMO ports are allocated across multiple Code Division Multiplexing groups for all users or UE layers (Scheduling Aware). At step 504, code selection according to the number of ports in the CDM group level is performed. At step 506, the spreading factor allocated for all the ports is determined. At step 508, DCI signaling of the Partial Port Occupancy (P-Poi) transmission for each UE is determined. At step 510, the receiver obtains the channel estimates by performing channel estimation with VSFOCC despreading based on the assigned spreading factor. The channel estimation herein combines least squares (LS) and despreading interpolation methods. At step 512, the channel estimates obtained at the receiver are interpolated to estimate the channel over a number of Physical Resource block, $N_{PRB}$, subcarriers.

FIGS. 6a-6d are graphs illustrating the simulation results of four exemplary Mean Squared Error (MSE) for channel estimates, each pertaining to one of the four DM-RS configurations, according to the embodiments herein. In some embodiments, the simulations are used to evaluate the Mean Square Error (MSE) of the various channel estimation schemes. The channel model used is TDL-C, which follows Rayleigh fading. The MSE results obtained are averaged over 1000 realizations of the channel. The simulation parameters are given in the Table 3 below. Perfect timing and frequency synchronization is assumed at the receiver.

TABLE 3

| Simulation parameters | |
| --- | --- |
| System Bandwidth | 50 MHZ |
| FFT Size N | 2048 |
| Subcarrier Spacing | 30 kHz |
| Symbol duration | 33.33 µs |
| Allocated PRBs $N_{PRB}$ | 12 |
| Cyclic Prefix duration | 2.34 µs |
| Power Delay Profile | TDL-C |
| Delay spread | 1.95 µs |
| Maximum Doppler spread | 50 Hz |

The simulation results compare the MSE results of CFR estimates between a port and the UE with the standard specified OCC and the VSFOCC method according to the present disclosure under the same channel conditions. The VSFOCC method doubles the number of estimates for partially loaded CDM groups, thus leading to a decrease in interpolation error. This reduction in interpolation error shows up as an MSE gain in higher SNRs for channels with moderate to high delay spread. The UE receives pilots from all ports and estimates the channel from the scheduled port. The simulation results for four scenarios, each pertaining to one of the four DM-RS configurations, are shown.

Figure 6A:
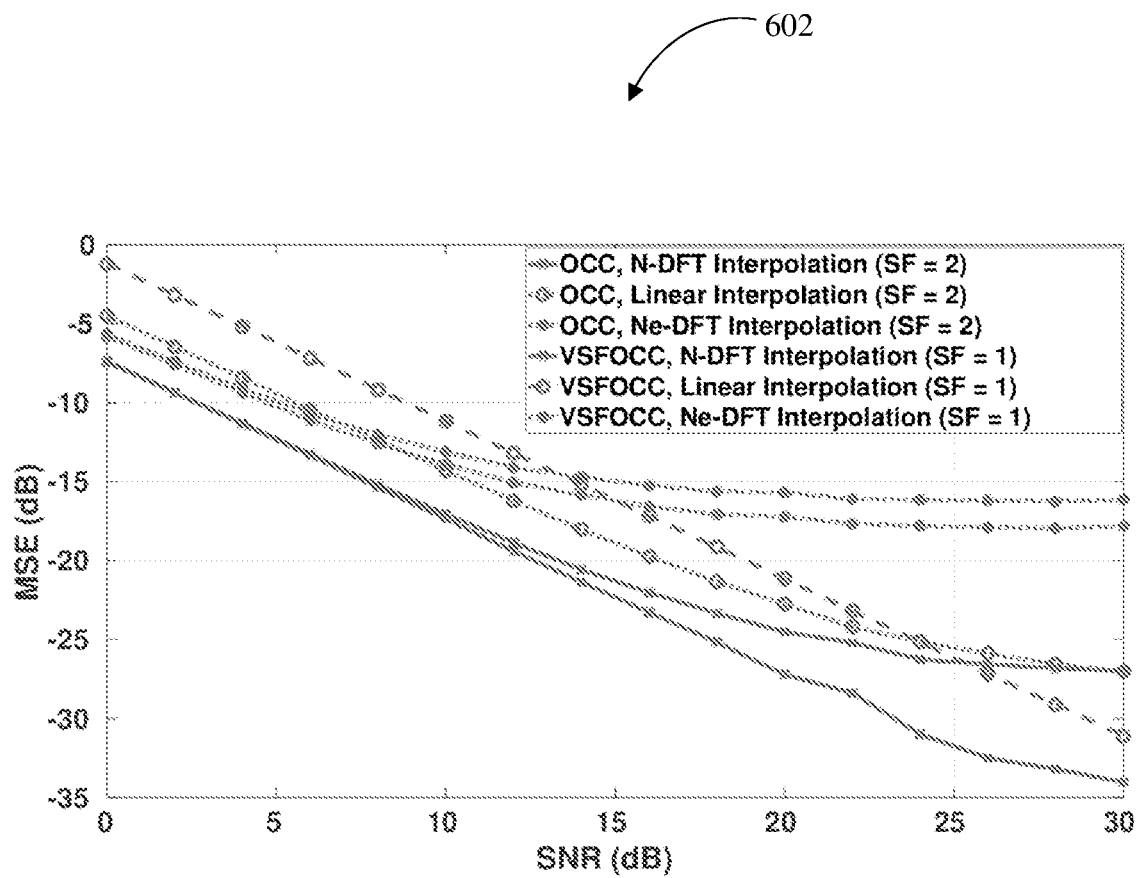
FIGS. 6A-6D are graphs illustrating the simulation results of four exemplary Mean Squared Error (MSE) for channel estimates, each pertaining to one of the four DM-RS configurations, according to the embodiments herein.

FIG. 6a is a graph 602 illustrating the MSE of a port using VSFOCC with P=3, according to a first example scenario. In a single symbol, DM-RS with P=3; VSFOCC is applied to the Port 1, and the MSE is compared between existing OCC and the method disclosed in the present disclosure as shown in FIG. 10a. From the result, it can be seen that Ne-point DFT interpolators are not suitable even for minimum users because of the poor resolution of channel taps. Hence, only N-point DFT interpolator is used for the remaining cases. The MSE values of all ports with N-DFT interpolation following OCC and VSFOCC are shown in Table 4. The MSE of Port 1 is improved, whereas the others remain the same.

TABLE 4

| MSE Comparison of all ports | | |
| --- | --- | --- |
| | MSE in dB at SNR = 20 dB | |
| Port | OCC | VSFOCC |
| Port 1 | −24.51 | −27.21 |
| Port 2 | −23.03 | −23.03 |
| Port 3 | −22.97 | −22.97 |

Figure 6B:
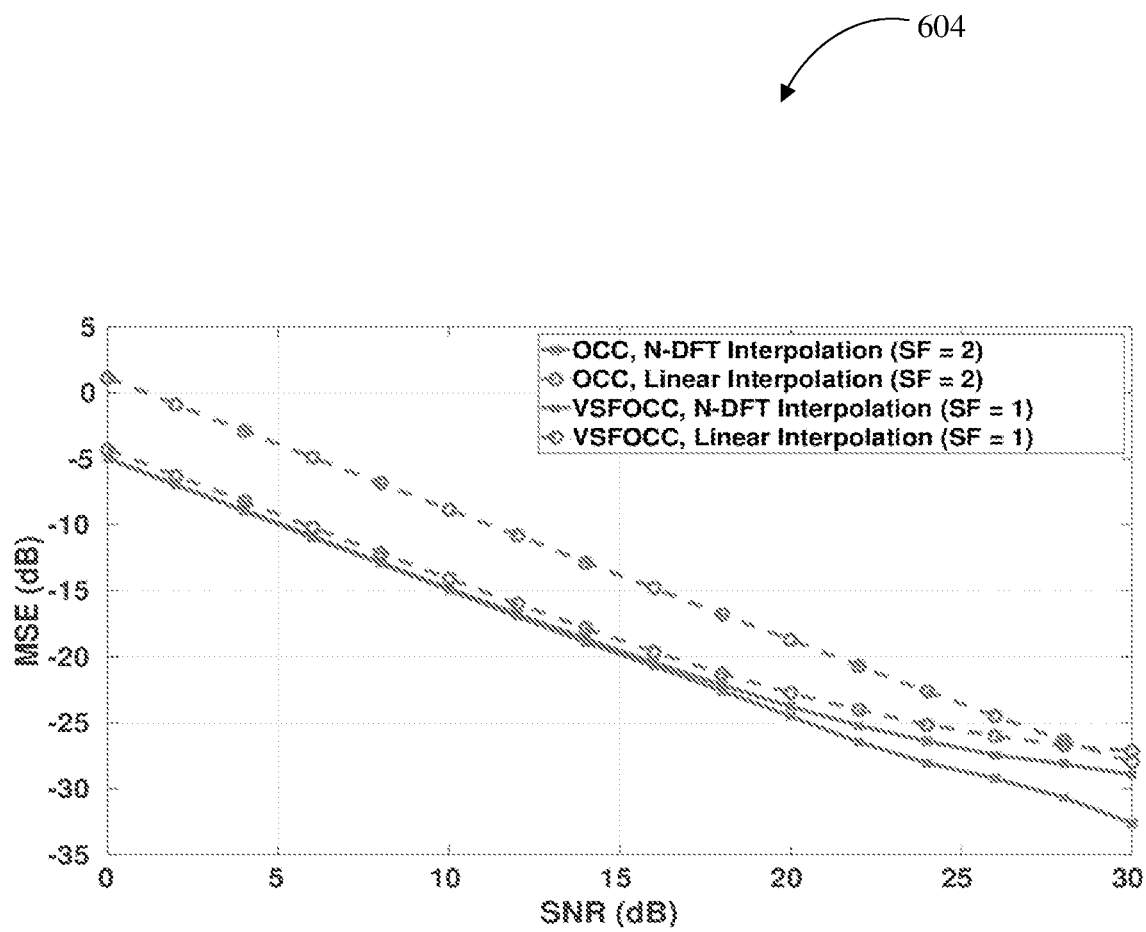

FIG. 6b is a graph 604 illustrating MSE of a port using VSFOCC with P=5 according to a second example scenario. With P=5, the ports are scheduled in {CDM 0, CDM 1, CDM 2} as {($P_1$, $P_2$), ($P_1$, $P_2$), ($P_2$)} in Type 2 configuration. The port in CDM group 2 is assigned with a variable spreading factor (SF=1) instead of two. The performance of that port with VSFOCC is better than the existing Walsh spreading. The results can be seen in FIG. 6b.

Figure 6C:
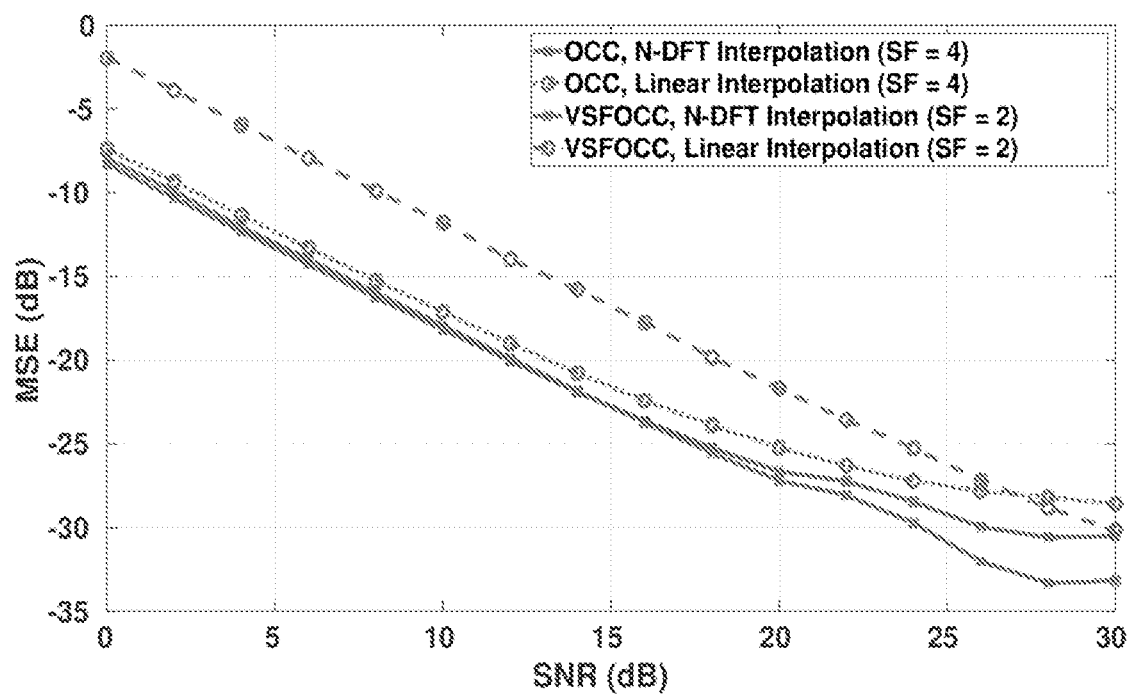

FIG. 6c is a graph 606 illustrating MSE of one of the ports using VSFOCC with P=10 according to a third example scenario. In this scenario, different number of ports are considered in the double symbol Type 2 configuration. The number of ports considered, P=10 are scheduled. With the different number of ports in the double symbol Type 2 configuration allocation, two ports get an advantage over OCC. The MSE graph of one of the ports is shown in FIG. 6c.

Figure 6D:
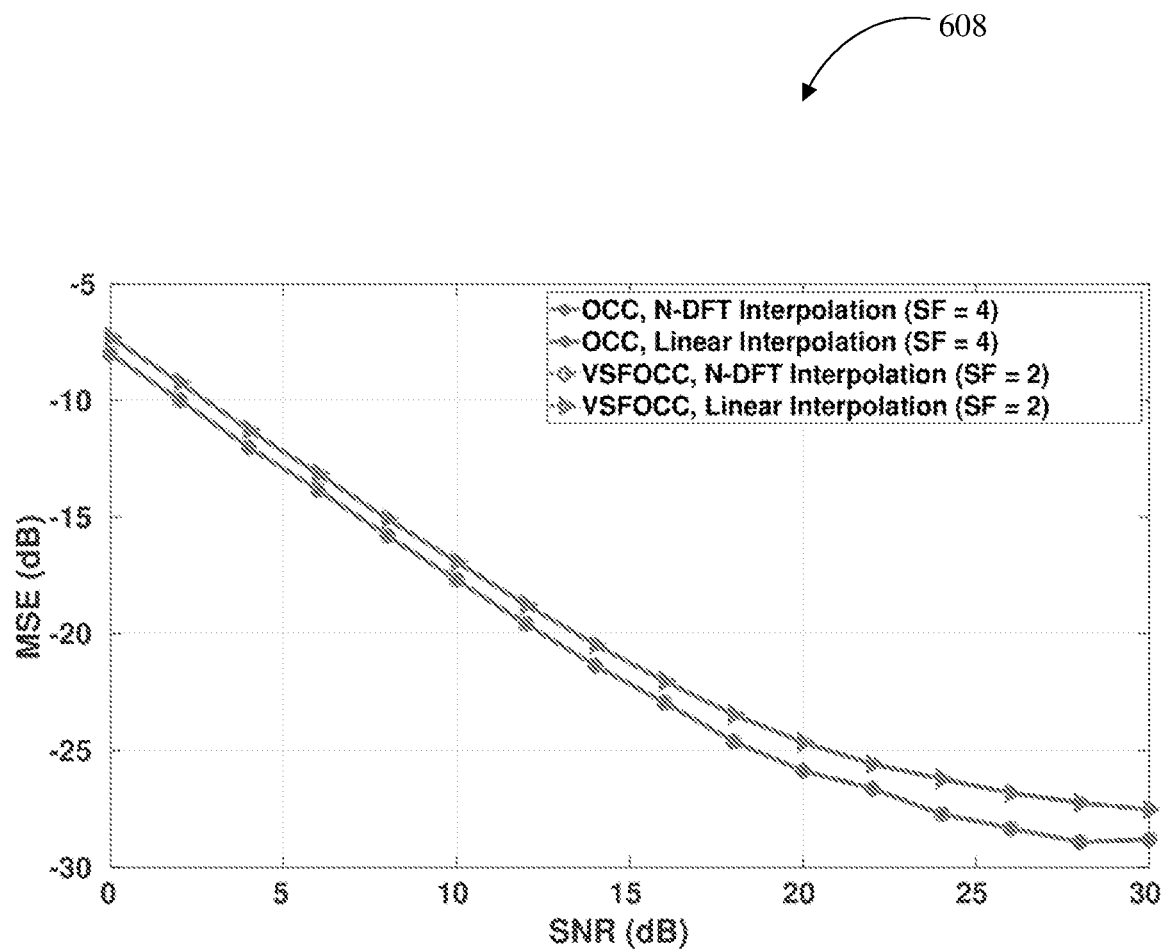

FIG. 6d is a graph 608 illustrating MSE of one of the ports using VSFOCC with P=12 according to a third example scenario. When entire DM-RS resources are allocated with P=12, the OCC allocation and VSFOCC are identical. The MSE result showing the similar performance between OCC and VSFOCC for one of the ports is shown in FIG. 6d.

The embodiments herein provide uniformly better MSE for Type 1 configuration, and it provides better MSE from medium to moderate SNRs for Type 2. As VSFOCC reduces the spreading factor, noise averaging reduces, which in turn directly impacts the linear interpolation performance.

In some aspects, the embodiments of the present disclosure improve mean squared error of channel estimates because of the increase in the number of distinct channel estimates in certain ports. The improved mean squared error can translate to a lower block error rate and hence provide a higher throughput. Further, it does not require any changes in the complexity of the transmitter or receiver.

The different allocation strategies give slightly different MSE performances. The example case of MSE performance for 10 UEs with two different allocation strategies in Type 2 double symbol configuration is tabulated below.

| Allocation (CDM0, CDM1, CDM2) | SNR = 27 dB | | MSE Improvement | SNR = 30 dB | | MSE Improvement |
| --- | --- | --- | --- | --- | --- | --- |
| | OCC | VSFOCC | (dB) | OCC | VSFOCC | (dB) |
| (3, 3, 2) | −28.6 | −30.6 | 2 | −29.6 | −31.6 | 2 |
| | −28.8 | −30.4 | 1.6 | −29.2 | −31.4 | 2.2 |
| | −28.2 | −30.4 | 2.2 | −28.8 | −31.2 | 2.4 |
| | −29.1 | −30.9 | 1.8 | −29.6 | −32.1 | 2.5 |
| Average MSE Improvement | | | 1.9 | | | 2.275 |
| (4, 2, 2) | −28.9 | −30.7 | 1.8 | −29.5 | −31.8 | 2.3 |
| | −28.5 | −30.1 | 1.6 | −29.3 | −31.5 | 2.2 |
| | −29 | −30.8 | 1.8 | −29.7 | −31.9 | 2.2 |
| | −28.6 | −30.2 | 1.6 | −29.3 | −31.2 | 1.9 |
| Average MSE Improvement | | | 1.7 | | | 2.15 |

In some embodiments, additional DMRS port combinations are added in the DCI to increase the possibilities for the port combinations to enable the optimal channel estimation in partial port occupancy. Following modifications are proposed for Table 7.3.1.1.2-8 through Table 7.3.1.1.2-23 in 38.212. Some tables may require additional bits.

(i) Modifications to Table 7.3.1.1.2-8: Antenna port(s), transform precoder is disabled, dmrs-Type=1, max-Length=1, rank=1

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6-7 | Reserved | Reserved |
| 6 | 1 | 2 |
| 7 | 1 | 3 |

(ii) Modifications to Table 7.3.1.1.2-9: Antenna port(s), transform precoder is disabled, dmrs-Type=1, max-Length=1, rank=2

| Value | Number of DMRS CDM group(s) without data | DMRS port(s) |
|---|---|---|
| 0 | 1 | 0, 1 |
| 1 | 2 | 0, 1 |
| 2 | 2 | 2, 3 |
| 3 | 2 | 0, 2 |
| 4-7 | Reserved | Reserved |
| 4 | 2 | 0, 3 |
| 5 | 2 | 1, 2 |
| 6 | 2 | 1, 3 |
| 7 | 1 | 2, 3 |

(iii) Modifications to Table 7.3.1.1.2-10: Antenna port(s), transform precoder is disabled, dmrs-Type=1, max-Length=1, rank=3

| Value | Number of DMRS CDM group(s) without data | DMRS port(s) |
|---|---|---|
| 0 | 2 | 0-2 |
| 2-7 | Reserved | Reserved |
| 2 | 2 | 0, 1, 3 |
| 3 | 2 | 0, 2, 3 |
| 4 | 2 | 1, 2, 3 |

(iv) Modifications to Table 7.3.1.1.2-11: Antenna port(s), transform precoder is disabled, dmrs-Type=1, max-Length=1, rank=4

| Value | Number of DMRS CDM group(s) without data | DMRS port(s) |
|---|---|---|
| 0 | 2 | 0-3 |
| 2-7 | Reserved | Reserved |

(v) Modifications to Table 7.3.1.1.2-12: Antenna port(s), transform precoder is disabled, dmrs-Type=1, max-Length=2, rank=1

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 2 | 0 | 2 |
| 7 | 2 | 1 | 2 |
| 8 | 2 | 2 | 2 |
| 9 | 2 | 3 | 2 |
| 10 | 2 | 4 | 2 |
| 11 | 2 | 5 | 2 |
| 12 | 2 | 6 | 2 |
| 13 | 2 | 7 | 2 |
| 14-15 | Reserved | Reserved | Reserved |

(vi) Modifications to Table 7.3.1.1.2-13: Antenna port(s), transform precoder is disabled, dmrs-Type=1, max-Length=2, rank=2

| Value | Number of DMRS CDM group(s) without data | DMRS port(s) | Number of front-load symbols |
|---|---|---|---|
| 0 | 1 | 0, 1 | 1 |
| 1 | 2 | 0, 1 | 1 |
| 2 | 2 | 2, 3 | 1 |
| 3 | 2 | 0, 2 | 1 |
| 4 | 2 | 0, 1 | 2 |
| 5 | 2 | 2, 3 | 2 |
| 6 | 2 | 4, 5 | 2 |
| 7 | 2 | 6, 7 | 2 |
| 8 | 2 | 0, 4 | 2 |
| 9 | 2 | 2, 6 | 2 |
|  | 2 | 1, 4 |  |
|  | 2 | 0, 5 |  |
|  | 2 | 1, 5 |  |
|  | 2 | 2, 7 |  |
|  | 2 | 3, 6 |  |
|  | 2 | 3, 7 |  |

(vii) Modifications to Table 7.3.1.1.2-14: Antenna port(s), transform precoder is disabled, dmrs-Type=1, max-Length=2, rank=3

| Value | Number of DMRS CDM group(s) without data | DMRS port(s) | Number of front-load symbols |
|---|---|---|---|
| 0 | 2 | 0-2 | 1 |
| 1 | 2 | 0, 1, 4 | 2 |
| 2 | 2 | 2, 3, 6 | 2 |
|  | 2 | 1, 4, 5 |  |
|  | 2 | 3, 6, 7 |  |
|  | 2 | 0, 4, 5 |  |
|  | 2 | 2, 6, 7 |  |
|  | 2 | 0, 1, 5 |  |
|  | 2 | 2, 3, 7 |  |

(viii) Modifications to Table 7.3.1.1.2-15: Antenna port(s), transform precoder is disabled, dmrs-Type=1, max-Length=2, rank=4

| Value | Number of DMRS group(s) without data | DMRS port(s) | Number of front-load symbols |
|---|---|---|---|
| 0 | 2 | 0-3 | 1 |
| 1 | 2 | 0, 1, 4, 5 | 2 |
| 2 | 2 | 2, 3, 6, 7 | 2 |
| 3 | 2 | 0, 2, 4, 6 | 2 |
| 4-15 | Reserved | Reserved | Reserved |

(ix) Modifications to Table 7.3.1.1.2-16: Antenna port(s), transform precoder is disabled, dmrs-Type=2, max-Length=1, rank=1

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 3 | 0 |
| 7 | 3 | 1 |
| 8 | 3 | 2 |
| 9 | 3 | 3 |
| 10 | 3 | 4 |
| 11 | 3 | 5 |
| 12-15 | Reserved | Reserved |

(x) Modifications to Table 7.3.1.1.2-17: Antenna port(s), transform precoder is disabled, dmrs-Type=2, max-Length=1, rank=2

| Value | Number of DMRS CDM group(s) without data | DMRS port(s) |
|---|---|---|
| 0 | 1 | 0, 1 |
| 1 | 2 | 0, 1 |
| 2 | 2 | 2, 3 |
| 3 | 3 | 0, 1 |
| 4 | 3 | 2, 3 |
| 5 | 3 | 4, 5 |
| 6 | 2 | 0, 2 |
|   | 2 | 0, 3 |
|   | 2 | 1, 2 |
|   | 2 | 1, 3 |
|   | 3 | 2, 4 |
|   | 3 | 2, 5 |
|   | 3 | 3, 4 |
|   | 3 | 3, 5 |
|   | 3 | 0, 4 |
|   | 3 | 0, 5 |
|   | 3 | 1, 4 |
|   | 3 | 1, 5 |

(xi) Modifications to Table 7.3.1.1.2-18: Antenna port(s), transform precoder is disabled, dmrs-Type=2, max-Length=1, rank=3

| Value | Number of DMRS CDM group(s) without data | DMRS port(s) |
|---|---|---|
| 0 | 2 | 0-2 |
| 1 | 3 | 0-2 |
| 2 | 3 | 3-5 |
| 3 | 3 | 2, 4, 5 |
|   | 3 | 2-4 |
|   | 3 | 2, 3, 5 |
|   | 2/3 | 0, 1, 3 |
|   | 2/3 | 1-3 |
|   | 2/3 | 0, 2, 3 |

(xii) Modifications to Table 7.3.1.1.2-19: Antenna port(s), transform precoder is disabled, dmrs-Type=2, max-Length=1, rank=4

| Value | Number of DMRS CDM group(s) without data | DMRS port(s) |
|---|---|---|
| 0 | 2 | 0-3 |
| 1 | 3 | 0-3 |
|   | 3 | 2-5 |

(xiii) Modifications to Table 7.3.1.1.2-20: Antenna port(s), transform precoder is disabled, dmrs-Type=2, max-Length=2, rank=1

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 3 | 0 | 1 |
| 7 | 3 | 1 | 1 |
| 8 | 3 | 2 | 1 |
| 9 | 3 | 3 | 1 |
| 10 | 3 | 4 | 1 |
| 11 | 3 | 5 | 1 |
| 12 | 3 | 0 | 2 |
| 13 | 3 | 1 | 2 |
| 14 | 3 | 2 | 2 |
| 15 | 3 | 3 | 2 |
| 16 | 3 | 4 | 2 |
| 17 | 3 | 5 | 2 |
| 18 | 3 | 6 | 2 |
| 19 | 3 | 7 | 2 |
| 20 | 3 | 8 | 2 |
| 21 | 3 | 9 | 2 |
| 22 | 3 | 10 | 2 |
| 23 | 3 | 11 | 2 |
| 24 | 1 | 0 | 2 |
| 25 | 1 | 1 | 2 |
| 26 | 1 | 6 | 2 |
| 27 | 1 | 7 | 2 |
| 28-31 | Reserved | Reserved | Reserved |

(xiv) Modifications to Table 7.3.1.1.2-21: Antenna port(s), transform precoder is disabled, dmrs-Type=2, max-Length=2, rank=2

| Value | Number of DMRS CDM group(s) without data | DMRS port(s) | Number of front-load symbols | Additional Comments |
|---|---|---|---|---|
| 0 | 1 | 0, 1 | 1 | |
| 1 | 2 | 0, 1 | 1 | |
| 2 | 2 | 2, 3 | 1 | |

-continued

| Value | Number of DMRS CDM group(s) without data | DMRS port(s) | Number of front-load symbols | Additional Comments |
|---|---|---|---|---|
| 3 | 3 | 0, 1 | 1 | |
| 4 | 3 | 2, 3 | 1 | |
| 5 | 3 | 4, 5 | 1 | |
| 6 | 2 | 0, 2 | 1 | |
| 7 | 3 | 0, 1 | 2 | |
| 8 | 3 | 2, 3 | 2 | |
| 9 | 3 | 4, 5 | 2 | |
| 10 | 3 | 6, 7 | 2 | |
| 11 | 3 | 8, 9 | 2 | |
| 12 | 3 | 10, 11 | 2 | |
| 13 | 1 | 0, 1 | 2 | |
| 14 | 1 | 6, 7 | 2 | |
| 15 | 2 | 0, 1 | 2 | |
| 16 | 2 | 2, 3 | 2 | |
| 17 | 2 | 6, 7 | 2 | |
| 18 | 2 | 8, 9 | 2 | |
| 19 | 3 | 0, 6 | | Use Reserved field |
| 20 | 3 | 0, 7 | | Use Reserved field |
| 21 | 3 | 1, 6 | | Use Reserved field |
| 22 | 3 | 1, 7 | | Use Reserved field |
| 23 | 3 | 2, 8 | | Use Reserved field |
| 24 | 3 | 2, 9 | | Use Reserved field |
| 25 | 3 | 3, 8 | | Use Reserved field |
| 26 | 3 | 3, 9 | | Use Reserved field |
| 27 | 3 | 4, 10 | | Use Reserved field |
| 28 | 3 | 4, 11 | | Use Reserved field |
| 29 | 3 | 5, 10 | | Use Reserved field |
| 30 | 3 | 5, 11 | | Use Reserved field |
| 31 | 3 | 0, 3 | | Use Reserved field |
| 32 | 3 | 0, 8 | | Reserve field exhausted, need additional bits for indication |
| 33 | 3 | 0, 9 | | Reserve field exhausted, need additional bits for indication |
| 34 | 3 | 1, 2 | | Reserve field exhausted, need additional bits for indication |
| 35 | 3 | 1, 3 | | Reserve field exhausted, need additional bits for indication |
| 36 | 3 | 1, 8 | | Reserve field exhausted, need additional bits for indication |
| 37 | 3 | 1, 9 | | Reserve field exhausted, need additional bits for indication |
| 38 | 3 | 2, 6 | | Reserve field exhausted, need additional bits for indication |
| 39 | 3 | 3, 6 | | Reserve field exhausted, need additional bits for indication |
| 40 | 3 | 6, 8 | | Reserve field exhausted, need additional bits for indication |
| 41 | 3 | 6, 9 | | Reserve field exhausted, need additional bits for indication |
| 42 | 3 | 2, 7 | | Reserve field exhausted, need additional bits for indication |
| 43 | 3 | 3, 7 | | Reserve field exhausted, need additional bits for indication |
| 44 | 3 | 7, 8 | | Reserve field exhausted, need additional bits for indication |
| 45 | 3 | 7, 9 | | Reserve field exhausted, need additional bits for indication |
| 46 | 3 | 0, 4 | | Reserve field exhausted, need additional bits for indication |
| 47 | 3 | 0, 5 | | Reserve field exhausted, need additional bits for indication |
| 48 | 3 | 0, 10 | | Reserve field exhausted, need additional bits for indication |
| 49 | 3 | 0, 11 | | Reserve field exhausted, need additional bits for indication |
| 50 | 3 | 1, 4 | | Reserve field exhausted, need additional bits for indication |
| 51 | 3 | 1, 5 | | Reserve field exhausted, need additional bits for indication |
| 52 | 3 | 1, 10 | | Reserve field exhausted, need additional bits for indication |
| 53 | 3 | 1, 11 | | Reserve field exhausted, need additional bits for indication |
| 54 | 3 | 4, 6 | | Reserve field exhausted, need additional bits for indication |
| 55 | 3 | 5, 6 | | Reserve field exhausted, need additional bits for indication |
| 56 | 3 | 6, 10 | | Reserve field exhausted, need additional bits for indication |
| 57 | 3 | 6, 11 | | Reserve field exhausted, need additional bits for indication |
| 58 | 3 | 4, 7 | | Reserve field exhausted, need additional bits for indication |
| 59 | 3 | 5, 7 | | Reserve field exhausted, need additional bits for indication |
| 60 | 3 | 7, 10 | | Reserve field exhausted, need additional bits for indication |
| 61 | 3 | 7, 11 | | Reserve field exhausted, need additional bits for indication |
| 62 | 3 | 2, 4 | | Reserve field exhausted, need additional bits for indication |
| 63 | 3 | 2, 5 | | Reserve field exhausted, need additional bits for indication |
| 64 | 3 | 2, 10 | | Reserve field exhausted, need additional bits for indication |
| 65 | 3 | 2, 11 | | Reserve field exhausted, need additional bits for indication |
| 66 | 3 | 3, 4 | | Reserve field exhausted, need additional bits for indication |
| 67 | 3 | 3, 10 | | Reserve field exhausted, need additional bits for indication |
| 68 | 3 | 2, 5 | | Reserve field exhausted, need additional bits for indication |
| 69 | 3 | 3, 11 | | Reserve field exhausted, need additional bits for indication |
| 70 | 3 | 4, 8 | | Reserve field exhausted, need additional bits for indication |
| 71 | 3 | 5, 8 | | Reserve field exhausted, need additional bits for indication |
| 72 | 3 | 8, 10 | | Reserve field exhausted, need additional bits for indication |
| 73 | 3 | 8, 11 | | Reserve field exhausted, need additional bits for indication |
| 74 | 3 | 4, 9 | | Reserve field exhausted, need additional bits for indication |
| 75 | 3 | 5, 9 | | Reserve field exhausted, need additional bits for indication |
| 76 | 3 | 9, 10 | | Reserve field exhausted, need additional bits for indication |
| 77 | 3 | 9, 11 | | Reserve field exhausted, need additional bits for indication |

Modifications to Table 7.3.1.1.2-22: Antenna port(s), transform precoder is disabled, dmrs-Type=2, maxLength=2, rank=3

| Value | Number of DMRS CDM group(s) without data | DMRS port(s) | Number of front-load symbols | Additional Comments |
|---|---|---|---|---|
| 0 | 2 | 0-2 | 1 | |
| 1 | 3 | 0-2 | 1 | |
| 2 | 3 | 3-5 | 1 | |
| 3 | 3 | 0, 1, 6 | 2 | |
| 4 | 3 | 2, 3, 8 | 2 | |
| 5 | 3 | 4, 5, 10 | 2 | |
| 6 | 3 | 2, 3, 6, 7 | | Use Reserved field |
| 7 | 3 | 6, 7, 8, 9 | | Use Reserved field |

| Value | Number of DMRS CDM group(s) without data | DMRS port(s) | Number of front-load symbols | Additional Comments |
|---|---|---|---|---|
| 8 | 3 | 2, 3, 4, 5 | | Use Reserved field |
| 9 | 3 | 2, 3, 10, 11 | | Use Reserved field |
| 10 | 3 | 4, 5, 8, 9 | | Use Reserved field |
| 11 | 3 | 8, 9, 10, 11 | | Use Reserved field |
| 12 | 3 | 0, 1, 4, 5 | | Use Reserved field |
| 13 | 3 | 0, 1, 10, 11 | | Use Reserved field |
| 14 | 3 | 4, 5, 6, 7 | | Use Reserved field |
| 15 | 3 | 6, 7, 10, 11 | | Use Reserved field |
| 16 | 3 | 6, 7, 9 | | Use Reserved field |
| 17 | 3 | 0, 2, 3 | | Use Reserved field |
| 18 | 3 | 01-Mar | | Use Reserved field |
| 19 | 3 | 2, 3, 6 | | Use Reserved field |
| 20 | 3 | 2, 3, 7 | | Use Reserved field |
| 21 | 3 | 0, 3, 8 | | Use Reserved field |
| 22 | 3 | 1, 3, 8 | | Use Reserved field |
| 23 | 3 | 3, 6, 8 | | Use Reserved field |
| 24 | 3 | 3, 7, 8 | | Use Reserved field |
| 25 | 3 | 0, 8, 9 | | Use Reserved field |
| 26 | 3 | 1, 8, 9 | | Use Reserved field |
| 27 | 3 | 6, 8, 9 | | Use Reserved field |
| 28 | 3 | 07-Sep | | Use Reserved field |
| 29 | 3 | 0, 1, 4 | | Use Reserved field |
| 30 | 3 | 0, 1, 5 | | Use Reserved field |
| 31 | 3 | 0, 1, 10 | | Use Reserved field |
| 32 | 3 | 0, 1, 11 | | Reserve field exhausted, need additional bits for indication |
| 33 | 3 | 1, 4, 6 | | Reserve field exhausted, need additional bits for indication |
| 34 | 3 | 1, 5, 6 | | Reserve field exhausted, need additional bits for indication |
| 35 | 3 | 1, 6, 10 | | Reserve field exhausted, need additional bits for indication |
| 36 | 3 | 1, 6, 11 | | Reserve field exhausted, need additional bits for indication |
| 37 | 3 | 4, 6, 7 | | Reserve field exhausted, need additional bits for indication |
| 38 | 3 | 05-Jul | | Reserve field exhausted, need additional bits for indication |
| 39 | 3 | 6, 7, 10 | | Reserve field exhausted, need additional bits for indication |
| 40 | 3 | 6, 7, 11 | | Reserve field exhausted, need additional bits for indication |
| 41 | 3 | 0, 4, 5 | | Reserve field exhausted, need additional bits for indication |
| 42 | 3 | 1, 4, 5 | | Reserve field exhausted, need additional bits for indication |
| 43 | 3 | 04-Jun | | Reserve field exhausted, need additional bits for indication |
| 44 | 3 | 4, 5, 7 | | Reserve field exhausted, need additional bits for indication |
| 45 | 3 | 0, 5, 10 | | Reserve field exhausted, need additional bits for indication |
| 46 | 3 | 1, 5, 10 | | Reserve field exhausted, need additional bits for indication |
| 47 | 3 | 5, 6, 10 | | Reserve field exhausted, need additional bits for indication |
| 48 | 3 | 5, 7, 10 | | Reserve field exhausted, need additional bits for indication |
| 49 | 3 | 0, 10, 11 | | Reserve field exhausted, need additional bits for indication |
| 50 | 3 | 1, 10, 11 | | Reserve field exhausted, need additional bits for indication |
| 51 | 3 | 6, 10, 11 | | Reserve field exhausted, need additional bits for indication |
| 52 | 3 | 7, 10, 11 | | Reserve field exhausted, need additional bits for indication |
| 53 | 3 | 02-Apr | | Reserve field exhausted, need additional bits for indication |
| 54 | 3 | 2, 3, 5 | | Reserve field exhausted, need additional bits for indication |
| 55 | 3 | 2, 3, 10 | | Reserve field exhausted, need additional bits for indication |
| 56 | 3 | 2, 3, 11 | | Reserve field exhausted, need additional bits for indication |
| 57 | 3 | 3, 4, 8 | | Reserve field exhausted, need additional bits for indication |
| 58 | 3 | 3, 5, 8 | | Reserve field exhausted, need additional bits for indication |
| 59 | 3 | 3, 8, 10 | | Reserve field exhausted, need additional bits for indication |
| 60 | 3 | 3, 8, 11 | | Reserve field exhausted, need additional bits for indication |
| 61 | 3 | 4, 8, 9 | | Reserve field exhausted, need additional bits for indication |
| 62 | 3 | 5, 8, 9 | | Reserve field exhausted, need additional bits for indication |
| 63 | 3 | 08-Oct | | Reserve field exhausted, need additional bits for indication |
| 64 | 3 | 8, 9, 11 | | Reserve field exhausted, need additional bits for indication |
| 65 | 3 | 2, 4, 5 | | Reserve field exhausted, need additional bits for indication |
| 66 | 3 | 3, 4, 5 | | Reserve field exhausted, need additional bits for indication |
| 67 | 3 | 4, 5, 8 | | Reserve field exhausted, need additional bits for indication |
| 68 | 3 | 4, 5, 9 | | Reserve field exhausted, need additional bits for indication |
| 69 | 3 | 2, 5, 10 | | Reserve field exhausted, need additional bits for indication |
| 70 | 3 | 3, 5, 10 | | Reserve field exhausted, need additional bits for indication |
| 71 | 3 | 5, 8, 10 | | Reserve field exhausted, need additional bits for indication |
| 72 | 3 | 5, 9, 10 | | Reserve field exhausted, need additional bits for indication |
| 73 | 3 | 2, 10, 11 | | Reserve field exhausted, need additional bits for indication |
| 74 | 3 | 3, 10, 11 | | Reserve field exhausted, need additional bits for indication |
| 75 | 3 | 8, 10, 11 | | Reserve field exhausted, need additional bits for indication |
| 76 | 3 | 09-Nov | | Reserve field exhausted, need additional bits for indication |
| 77 | 3 | 0, 1, 7 | | Reserve field exhausted, need additional bits for indication |
| 78 | 3 | 1, 6, 7 | | Reserve field exhausted, need additional bits for indication |
| 79 | 3 | 0, 6, 7 | | Reserve field exhausted, need additional bits for indication |
| 80 | 3 | 2, 3, 8 | | Reserve field exhausted, need additional bits for indication |
| 81 | 3 | 2, 3, 9 | | Reserve field exhausted, need additional bits for indication |
| 82 | 3 | 3, 8, 9 | | Reserve field exhausted, need additional bits for indication |
| 83 | 3 | 2, 8, 9 | | Reserve field exhausted, need additional bits for indication |
| 84 | 3 | 4, 5, 11 | | Reserve field exhausted, need additional bits for indication |
| 85 | 3 | 5, 10, 11 | | Reserve field exhausted, need additional bits for indication |
| 86 | 3 | 4, 10, 11 | | Reserve field exhausted, need additional bits for indication |

(xv) Modifications to Table 7.3.1.1.2-23: Antenna port(s), transform precoder is disabled, dmrs-Type=2, max-Length=2, rank=4

| Value | Number of DMRS CDM group(s) without data | DMRS port(s) | Number of front-load symbols |
|---|---|---|---|
| 0 | 2 | 0-3 | 1 |
| 1 | 3 | 0-3 | 1 |
| 2 | 3 | 0, 1, 6, 7 | 2 |
| 3 | 3 | 2, 3, 8, 9 | 2 |
| 4 | 3 | 4, 5, 10, 11 | 2 |
|   | 3 | 0, 1, 8, 9 |   |
|   | 3 | 2, 3, 6, 7 |   |
|   | 3 | 6, 7, 8, 9 |   |
|   | 3 | 2, 3, 4, 5 |   |
|   | 3 | 2, 3, 10, 11 |   |
|   | 3 | 4, 5, 8, 9 |   |
|   | 3 | 8, 9, 10, 11 |   |
|   | 3 | 0, 1, 4, 5 |   |
|   | 3 | 0, 1, 10, 11 |   |
|   | 3 | 4, 5, 6, 7 |   |
|   | 3 | 6, 7, 10, 11 |   |

In some aspects, the port allocation can be made in multiple ways. The order in which the CDM group filled varies for each case with the same number of ports getting the advantage of MSE. For e.g., If 10 ports are scheduled in total, the port allocation across three CDM groups in a double symbol type 2 DM-RS can be (4,4,2) or (4,3,3), as both add up to 10. The order in the above 3-tuples do not matter. For example, (4,4,2) as the above can be treated as equivalent to (2,4,4) and (4,2,4).key factor is the number of ports in each group. The specific CDM group it is assigned to doesn't matter, and all possible permutations are covered.

For the purposes of the embodiments of the present disclosure, the following abbreviations apply:

| Abbreviations | Description |
|---|---|
| PDU | Protocol Data Unit |
| MCS | Modulation & Coding Scheme |
| P-Poi | Partial Port Occupancy Information |
| VSFOCC | Variable Spreading Factor Orthogonal Cover Codes |
| DM-RS | Demodulation Reference Signal |
| OVSF | Orthogonal Variable Spreading Factor |
| MSE | Mean Squared Error |
| OCC | Orthogonal Cover Codes |
| PDSCH | Physical Downlink Shared Channel |
| PDCCH | Physical Downlink Control Channel |
| DCI | Downlink Control Information |
| CDM | Code Division Multiplexing |
| MU-MIMO | Multi-User Multiple Input Multiple Output |

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification.

What is claimed is:

1. A method for improving channel estimation for multi-user, multiple-input, multiple-output (MU-MIMO) systems through dynamic demodulation reference signal (DM-RS) port allocation in a 5G New Radio network, the method comprising:
    allocating, by a Scheduler aware UE port allocation unit, one or more MU MIMO ports to a plurality of code division multiplexing (CDM) groups for a plurality of UE users;
    performing, by a code selection unit, a code selection based on a number of MU-MIMO ports allocated to the plurality of CDM groups; where a Code Division Multiplexing (CDM) group is a set of time-frequency resources where MU-MIMO ports are multiplexed using orthogonality of codes;
    determining, by a spreading factor unit, a spreading factor allocated for each of the MU-MIMO ports in each of the plurality of CDM groups;
    determining, by a signalling unit, a Downlink Control Information (DCI) signalling of a Partial Port Occupancy (P-Poi) transmission for each UE; and
    obtaining, by a channel estimation unit, channel estimates at the receiver through variable spreading factor orthogonal cover codes (VSFOCC) de-spreading based on the P-POI assigned for each of the MU-MIMO ports; and
    interpolating, by a linear or DFT interpolator, the obtained channel estimates to determine the channel over a number of Physical Resource blocks ($N_{PRB}$), wherein the interpolation along with VSFOCC de-spreading increases the performance gain for channels.

2. The method of claim 1, wherein the Scheduling aware UE port mapping unit allots a plurality of spreading factors for the plurality of UE users based on a Modulation and Coding Scheme (MCS) information from a schedule unit.

3. The method of claim 1, wherein the code selection for each MU-MIMO port scheduled in the CDM group is assigned from an Orthogonal Variable Spreading Factor (OVSF tree) structure, where each MU-MIMO port present in a same CDM group are mapped to unique Orthogonal Cover Codes (OCC).

4. The method of claim 1, further comprising combining, by the channel estimator unit, least square estimation, and P-Poi information based de-spreading of the plurality of CDM groups to perform channel estimation.

5. The method of claim 1, further comprising:
    reducing an interpolation error of the channel estimates by increasing a number of unique channel estimates for partially loaded COM groups through VSFOCC de-spreading.

6. A multi-user, multiple-input, multiple-output (MU-MIMO) system to improve channel estimation in 5G New Radio Network, the system comprises:
    a transmitter comprising:
        a Scheduler aware UE port allocation unit to allocate one or more MU-MIMO ports to a plurality of code division multiplexing (CDM) groups for a plurality of UE users;
        a code selection unit to perform code selection according to a number of MU-MIMO ports assigned in the plurality of CDM groups, where a Code Division Multiplexing (CDM) group is a set of time-frequency resources where MU-MIMO ports are multiplexed using orthogonality of codes;
        a scheduler aware UE port mapping unit to allot a reduced de-spreading factor for the users based on the Modulation and Coding Scheme (MCS) and a total number of scheduled user information received from the Scheduler aware UE port allocation unit; and a spreading factor unit to determine the spreading factor for the allocated one or more MU-MIMO ports in each of the plurality of CDM groups;

a signalling unit to transmit Downlink Control Information (DCI) signalling of a Partial Port Occupancy (P-Poi) information for each User Equipment; and a receiver comprising:

a channel estimator unit to perform channel estimation with variable spreading factor orthogonal cover codes (VSFOCC) de-spreading based on a Partial Port Occupancy (P-Poi) assigned for each of the MU-MIMO ports; and an interpolator to interpolate the obtained channel estimates over a number of Physical Resource blocks, ($N_{PRB}$), wherein the interpolator is one of a linear or DFT interpolator, where interpolation along with VSFOCC de-spreading increases performance gain for channels.

7. The system of claim 6, wherein the Scheduling aware UE port mapping unit allots a plurality of spreading factors for the plurality of UE users based on a Modulation and Coding Scheme (MCS) information from a schedule unit.

8. The system of claim 6, wherein the code selection for each MU-MIMO port scheduled in the COM group is assigned from an Orthogonal Variable Spreading Factor (OVSF tree) structure, where each MU-MIMO port present in a same CDM group are mapped to unique Orthogonal Cover Codes (OCC).

9. The system of claim 6, wherein the channel estimator unit further combines a least square estimation and P-Poi information based de-spreading of the plurality of CDM groups to perform channel estimation.

10. The system of claim 6, wherein the interpolator is configured to reduce an interpolation error of the channel estimates by increasing a number of distinct channel estimates for partially loaded CDM groups through VSFOCC de-spreading.

\* \* \* \* \*